E. O. SCHWEITZER & A. HERZ.
ELECTRIC SWITCH.
APPLICATION FILED JULY 19, 1906.

923,129.                                         Patented May 25, 1909.
2 SHEETS—SHEET 1.

Witnesses:

Inventors:
Edmund O. Schweitzer
Alfred Herz

E. O. SCHWEITZER & A. HERZ.
ELECTRIC SWITCH.
APPLICATION FILED JULY 19, 1906.

923,129.

Patented May 25, 1909.
2 SHEETS—SHEET 2.

Witnesses:

Inventors:
Edmund O. Schweitzer
Alfred Herz
A. Miller Belfield
Atty.

UNITED STATES PATENT OFFICE.

EDMUND O. SCHWEITZER AND ALFRED HERZ, OF CHICAGO, ILLINOIS.

ELECTRIC SWITCH.

No. 923,129.  Specification of Letters Patent.  Patented May 25, 1909.

Application filed July 19, 1906.  Serial No. 326,925.

*To all whom it may concern:*

Be it known that we, EDMUND O. SCHWEITZER and ALFRED HERZ, citizens of the United States, residing at Chicago, in the county of Cook and State of Illinois, have invented a certain new and useful Improvement in Electric Switches, of which the following is a full, clear, concise, and exact description, reference being had to the accompanying drawings, forming a part of this specification.

Our invention relates to electric switches, and especially to a form of switch particularly adapted for use in connection with electric incandescent lighting circuits.

Prominent objects of the invention are, to provide a simple, practical and effective form of electric switch; to permit the circuit to be automatically broken by the switch after the circuit has been closed a predetermined length of time; and also to permit the circuit to be permanently opened and permanently closed in the usual way; and to accomplish the foregoing and other desirable results in a simple and expeditious manner.

In carrying out our invention in the manner herein set forth, we provide a switch, conveniently in the form of the usual electric light snap switch, having an hourglass arrangement by which the circuit is closed while the mobile substance of the hourglass, such for example as mercury, falls from one part of the glass to the other. Thus when the switch is operated, the circuit is closed and the lights lighted, or other useful result accomplished, during a period of time occupied by the hourglass in operating, and is automatically opened at the end of such period of time. This arrangement permits the switch to be operated to light the lights which will remain lighted for a short period of time, and will then be automatically extinguished by the switch. The switch is also desirably provided with mechanism by which the circuit can be permanently opened or permanently closed in the usual way to maintain the lights either lighted or out as desired.

Figure 1:
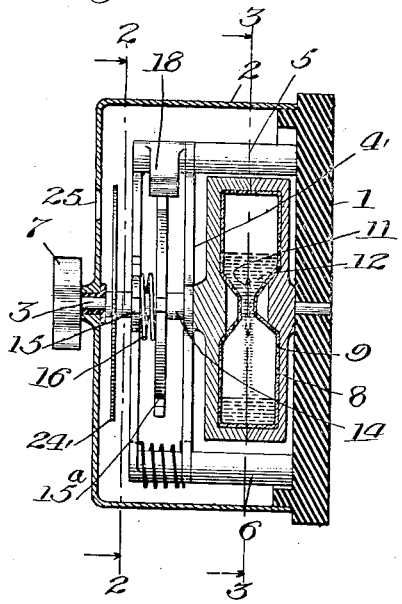
Figure 2:
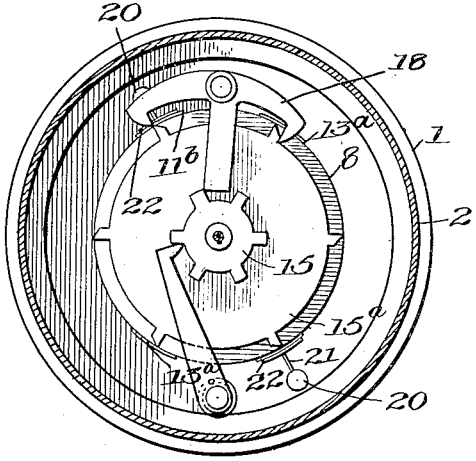
Figure 3:
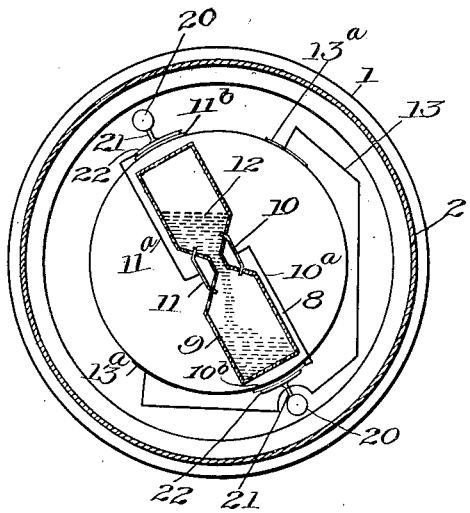
Figure 4:
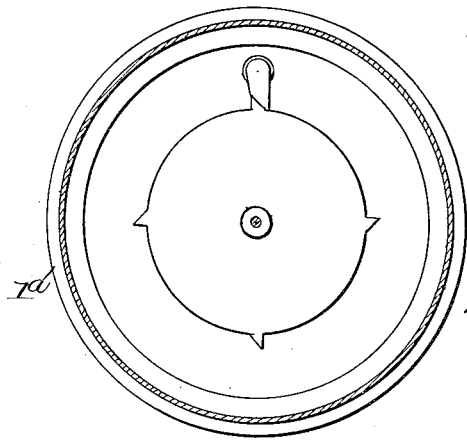
Figure 5:
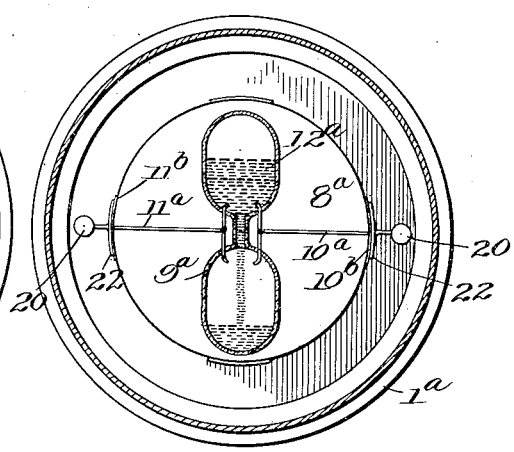

In the accompanying drawings, Figure 1 is a vertical section of a switch embodying our present invention; Figs. 2 and 3 are sections taken on lines 2—2 and 3—3 in Fig. 1; Figs. 4 and 5 are views of a modified form of switch; and Fig. 6 of a still different modification.

Referring first to the switch shown in Figs. 1, 2 and 3, we have shown a switch comprising a base 1 made of insulating material such as porcelain or the like, and a casing 2 made of metal and covering the operating parts of the switch. A spindle 3 is mounted in the casing 2 and in bearings on a support 4 secured to the base 1 by standards 5 and 6. The outer end of the spindle 3 is provided with a thumb piece 7 by which the spindle can be turned, and the inner end of the spindle carries a switching member conveniently consisting of a block 8 of wood or other suitable material, and an hourglass 9 embedded in said block 8. The hourglass 9 is provided with points 10, 10 and 11, 11 which may be conveniently provided by inserting platinum tips into the glass. The contacts 10, 10 are connected together and 11, 11 together, and one pair of points or contacts 10, 11 is located in each of the bulbs forming the hourglass. The glass 9 contains a mobile conductor 12 such as mercury or the like. The bulbs are desirably exhausted of air, and they are left in that condition or supplied with hydrogen or other gas. Conductors $10^a$ and $11^a$ are extended respectively from the contacts 10, 10 and 11, 11, to the periphery of the circular block 8, and connected with shoes $10^b$ and $11^b$ respectively. A conductor 13 is extended across the block 8 on a diameter 60° ahead of the diametric line of the hourglass 9 and terminated in shoes $13^a$, $13^a$ secured to said block.

The rotary switching member is secured to a sleeve 14 which is loose on the spindle 3. The spindle 3 is provided with a snap switch mechanism such as a six-pointed pinion 15 secured to the spindle, a toothed wheel $15^a$ secured to the loose shaft 14, and a spring 16 interposed between and connecting the pinion 15 and wheel $15^a$. An escapement 18 is mounted at the upper end of the post 5 and arranged to coöperate with the teeth of the pinion 15 and wheel $15^a$ so that by turning the thumb piece 7 the pinion 15 will be turned first, and then the wheel $15^a$ will be turned the distance of one tooth and then locked. Thus by turning the thumb piece 7, the switching member with its hourglass will be turned the distance of one of the teeth on the wheel $15^a$, and as this wheel is desirably provided with six teeth, the hourglass will be turned one-sixth of a revolution.

The base 1 is provided with binding posts or terminals 20, 20 from which are extended conductors 21, 21, terminating in shoes or brushes 22, 22 adapted to make contact with the shoes 10^b, 11^b and 13^a, 13^a when the same come opposite them. The spindle 3 is also conveniently provided with a disk 24 which is provided with suitable words, in this case "Off," "On" and "Time" which will appear through an opening 25 in the casing 2. Thus in operation the thumb piece 7 will be turned and the switching member, with its hourglass, rotated step by step to bring the hourglass into different positions sixty degrees apart. In the position shown in Fig. 3 connection will be made from the two sides of the circuit, through the hourglass contacts 10 and 11 and the mercury 12, so that it will be closed through the latter as long as there is any mercury between the contacts. When first brought into this position, the mercury will begin to flow from one bulb to another and so will close the circuit as long as sufficient mercury remains in the upper bulb to complete the circuit. When all the mercury has moved into the lower bulb, however, the circuit will be automatically opened. Thus in this position the circuit will be closed and the lights lighted for a period of time which can be predetermined by properly sizing the bulb and opening and supplying it with a sufficient amount of mercury. This position of the switch is called "time" and the disk 24, so labeled with this word, will come opposite the opening 25. In the next position in clockwise direction, the shoes 10^b and 11^b will be moved away from the shoes 22, 22, and so will be out of contact therewith and no contact will be made with the shoes 13^a, 13^a, so that the circuit will be entirely open to the switch, thereby breaking the circuit permanently. This position is called "off" and the disk 24 labeled accordingly. In the next position, the one in which the hourglass will assume a horizontal position, the shoes 13^a, 13^a will make contact with the shoes 22, 22, and thereby short-circuit the circuit through the conductor 13 and permanently close the circuit, so long as the switch remains in this position. This position is called "on" and the disk 24 marked accordingly. Thus it will be seen that this form of switch provides an arrangement by which the circuit can be temporarily closed, or can be permanently opened or permanently closed and the lights lighted accordingly, if the switch is used on a lighting circuit. The thumb piece 7 is desirably coated with phosphorescent paint, so that it will be luminous in the dark.

Figure 6:
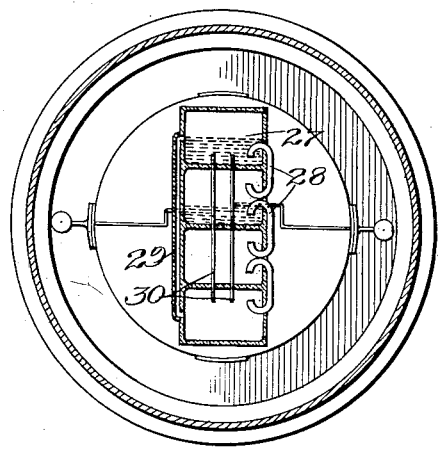

In Fig. 6, we have shown a switch embodying the foregoing features of construction and operation, and arranged so that the interval of time for the temporary closure of the circuit will be increased. In this arrangement the holder for the mobile conductor is formed of a plurality of chambers 27, 27 which are connected by siphon tubes 28, 28, and there is enough mercury or similar substance in the device to first fill the uppermost compartment above the top of its tube 28 so that the mercury will be siphoned out of this compartment and into the next compartment, and will be siphoned in this way from one compartment to another, thus materially augmenting the time during which the circuit will remain closed. A vent tube 29 is desirably provided to connect the uppermost and lowermost compartments 27, 27 so as to balance the pressure in the same, providing hydrogen, nitrogen or other gas is used in the device. Platinum wires 30, 30 are extended through the holder so as to be always in contact with the mercury and close the circuit no matter in what compartment the mercury is until it reaches the bottom compartment and becomes separated from the wires.

In Figs. 4 and 5 we have shown a still different modification of the switch. This form is a simple time switch by which the circuit is automatically closed for a predetermined period of time. There are no provisions for permanently closing the circuit. In this switch the rotary switch member 8^a has an hourglass 9^a provided with contacts and conductors 10^a and 11^a terminating in shoes 10^b and 11^b, as above described. These shoes coöperate with shoes 22, 22, mounted on the base 1^a, and connected to terminals 20, 20. The hourglass is rotated a quarter of a revolution at each operation, so that in one position the circuit will be through the mercury of the hourglass which by falling from one bulb to another will temporarily close the circuit, and in the other position the circuit will be permanently open, because of separation of the contact shoes. A small quantity of oil 12^a is on top of the mercury 12, the result of which is that when the circuit is broken by the mercury falling below the contacts, the break occurs in a dielectric which lessens or extinguishes the arc. This oil could of course be used in the other forms of switches shown herein.

It will be understood that the invention can be adapted to other switches and in other ways than herein set forth, and that changes and modifications can be made without departing from the spirit of the invention.

What we claim as our invention is:—

1. A device of the class specified comprising a double-chambered reversible holder having a narrow channel or neck connecting the chambers and also having contacts near this connecting neck, mercury confined in said holder, and a rotary member carrying said member and contact mechanism for coöperating with the contacts of said holder and step by step mechanism for permitting the rotation of said rotary member, and also for stopping same at predetermined points.

2. A switch comprising a rotary member carrying a double chambered inverted holder containing a mobile conductor, contacts on said holder whereby the connection will be closed through the switch upon the passage of the mobile conductor from one chamber to another; connections coöperating with said contacts and a conductor extending across the rotary member to short-circuit and permanetly close the circuit when the mobile conductor is in either chamber, means for rotating said rotary member and contacts coöperating with said conductor whereby the circuit can be closed a predetermined length of time by the mobile conductor or can be permanently closed through said conductor on the rotary member.

In witness whereof, we hereunto subscribe our names this 12th day of July A. D., 1906.

EDMUND O. SCHWEITZER.
ALFRED HERZ.

Witnesses:
A. M. BELFIELD,
I. C. LEE.